(12) United States Patent
Hunter

(10) Patent No.: US 8,331,722 B2
(45) Date of Patent: Dec. 11, 2012

(54) METHODS, APPARATUSES AND SYSTEMS PROVIDING PIXEL VALUE ADJUSTMENT FOR IMAGES PRODUCED BY A CAMERA HAVING MULTIPLE OPTICAL STATES

(75) Inventor: Gregory Michael Hunter, San Jose, CA (US)

(73) Assignee: Aptina Imaging Corporation, George Town (KY)

( * ) Notice: Subject to any disclaimer, the term of this patent is extended or adjusted under 35 U.S.C. 154(b) by 1374 days.

(21) Appl. No.: 12/007,256

(22) Filed: Jan. 8, 2008

(65) Prior Publication Data

US 2009/0175556 A1 Jul. 9, 2009

(51) Int. Cl.
*G06K 9/40* (2006.01)
(52) U.S. Cl. ......................... 382/274; 382/167
(58) Field of Classification Search .................. 382/274, 382/300, 285, 276, 167; 359/630, 785; 345/426, 345/427; 248/917; 250/548; 162/296, 113; 536/56
See application file for complete search history.

(56) References Cited

U.S. PATENT DOCUMENTS

| | | | |
|---|---|---|---|
| 5,245,025 A * | 9/1993 | Trokhan et al. ................. | 536/56 |
| 5,503,715 A * | 4/1996 | Trokhan et al. ............... | 162/296 |
| 6,094,221 A | 7/2000 | Andersion | |
| 6,747,757 B1 | 6/2004 | Enomoto | |
| 6,912,307 B2 | 6/2005 | Spitzer et al. | |
| 6,937,777 B2 | 8/2005 | Shirakawa | |
| 7,480,106 B2 * | 1/2009 | Sato et al. ....................... | 359/785 |
| 8,164,594 B2 * | 4/2012 | Watanabe et al. ............ | 345/426 |
| 2002/0094131 A1 | 7/2002 | Shirakawa | |
| 2003/0234864 A1 | 12/2003 | Matherson et al. | |
| 2003/0234872 A1 | 12/2003 | Matherson et al. | |
| 2004/0032952 A1 | 2/2004 | Pinto et al. | |
| 2004/0155970 A1 | 8/2004 | Johannesson et al. | |
| 2005/0041806 A1 | 2/2005 | Pinto et al. | |
| 2005/0179793 A1 | 8/2005 | Schweng | |
| 2006/0033005 A1 | 2/2006 | Jerdev et al. | |
| 2007/0211154 A1 | 9/2007 | Mahmoud | |

OTHER PUBLICATIONS

Manoj Aggarwal et al., "On Cosine-fourth and Vignetting Effects in Real Lenses", 2001 IEEE, pp. 472-479.
Ian Powell, "Technique employed in the development of antivignetting filters", Opt. Eng. 36 (1) 268-272, Jan. 1997.
Wonpil Yu et al., "Vignetting Distortion Correction Method for High Quality Digital Imaging", Proceeding of the 17th International Conference on Pattern Recognition (ICPR '04).
Wonpil Yu, "Practical Anti-vignetting Methods for Digital Cameras", IEEE Transactions on Consumer Electronics, vol. 50, No. 4, Nov. 2004.
Yin-Pao Chen et al., "An Anti-Vignetting Technique for Super Wide Field of View Mosaicked Images", Journal of Imaging Technology, vol. 12, No. 5, Oct. 1986.
M. Onoe, et al., "Real-Time Shading Corrector for a Television Camera Using a Microprocessor", Real-Time/Parallel Computing, Volume: Plenum: NY, pp. 339-346,1981.
Its'Hak Dinstein et al., "Imaging System Response Linearization and Shading Correction", 1984, IEEE, pp. 204-209.
Solene Quelard, "Image Quality Improvement for a CMOS Mobile Phone Digital Camera", Royal Institute of Technology, Feb. 2004, pp. 1-71.

* cited by examiner

*Primary Examiner* — Anh Hong Do

(57) ABSTRACT

Methods, apparatuses and systems for storing approximations of multiple spatial pixel value adjustment surfaces for use in pixel value correction. The adjustment surfaces may be used for positional gain adjustment. A representation of the multiple adjustment surfaces is stored as coefficients representing a multi-dimensional solid of two-dimensional adjustment surfaces. The stored coefficients are used to determine a plurality of additional sets of coefficients which sets are then in turn used to determine pixel correction values of adjustment surfaces.

25 Claims, 6 Drawing Sheets

METHODS, APPARATUSES AND SYSTEMS PROVIDING PIXEL VALUE ADJUSTMENT FOR IMAGES PRODUCED BY A CAMERA HAVING MULTIPLE OPTICAL STATES

FIELD OF THE INVENTION

Disclosed embodiments relate generally to pixel value adjustments for captured images to account for pixel value variations with variations in optical state.

BACKGROUND OF THE INVENTION

Imagers, such as for example CCD, CMOS and others, are widely used in imaging applications including digital still and video cameras.

It is well known that, for a given optical lens used with a digital still or video camera, the pixels of the pixel array will generally have varying signal values even if the imaged scene is uniform. The varying responsiveness depends on a pixel's spatial location within the pixel array. One source of such variation is lens shading. Roughly, lens shading causes pixels in a pixel array located farther away from the center of the pixel array to have a lower value when compared to pixels located closer to the center of the pixel array, when the camera is exposed a spatially uniform level of light stimulus. Other sources may also contribute to variations in a pixel value with spatial location. These variations can be compensated for by adjusting, for example, the gain applied to the pixel values based on spatial location in a pixel array. For lens shading correction, for example, it may happen that the further away a pixel is from the center of the pixel array, the more gain is needed to be applied to the pixel value. Different color channels may also be affected differently by various sources of shading. In addition, sometimes an optical lens is not centered with respect to the optical center of the imager; the effect is that lens shading may not be centered at the center of the imager pixel array. Each color channel may also have a different center, i.e., the pixel with the highest response.

Variations in the shape and orientation of photosensors used in the pixels may also contribute to a non-uniform spatial response across the pixel array. Further, spatial non-uniformity may be caused by optical crosstalk or other interactions among the pixels in a pixel array. Further, examples of how changes in optical states can change the spatial pattern of non-uniformity include variations in iris opening or focus position, each of which may affect a pixel value depending on spatial location.

Variations in a pixel signal caused by the spatial position of a pixel in a pixel array can be measured and the pixel response value can be corrected with a pixel value gain adjustment. Lens shading, for example, can be corrected using a set of positional gain adjustment values, which adjust pixel values in post-image capture processing. With reference to positional gain adjustment to correct for shading variations with a fixed optical state configuration, gain adjustments across the pixel array can typically be provided as pixel signal correction values, one corresponding to each of the pixels. The set of pixel correction values for the entire pixel array forms a gain adjustment surface for each of a plurality of color channels. For color sensors, the gain adjustment surface is applied to the pixels of the corresponding color channel during post-image capture processing to correct for variations in pixel value due to the spatial location of the pixels in the pixel array. For monochrome sensors, a single gain adjustment surface is applied to all the pixels of the pixel array.

When a gain adjustment surface is calculated for a specific color channel/camera/lens/IR-out filter, etc. combination, it is generally applied to all captured images from an imager having that combination. This does not present a particular problem when a camera has a single only optical state. Cameras with varying optical states however, will generally need different lens shading and other pixel correction values for each color channel at each different optical state. These varying corrections cannot be accurately implemented using a single gain adjustment surface for each color channel. Accordingly, it would be beneficial to have a variety of gain adjustments available, for each color channel for each of the varying optical states, to correct for the different patterns of pixel value spatial variation at the different optical states.

It may be possible to address the problem of different focal lengths of a lens by storing a relatively large number of sets of gain adjustment surfaces, each set corresponding to one of the many possible optical states of a given lens, and each set containing an adjustment surface for each color channel. The storage overhead, however, would be large and a large amount of retrieval time, energy and power would be consumed when zoom lens position and or other optical state changes, for example, during video image capture, as each gain adjustment surface is first determined/retrieved and then applied to the captured image.

Accordingly, methods, apparatuses and systems providing spatial pixel gain adjustments ("positional gain adjustment") and other spatially-varying adjustments for use with pixel values of images captured using cameras using multiple optical states are desirable.

One solution, as described in copending application Ser. No. 11/798,281, entitled METHODS, APPARATUSES AND SYSTEMS PROVIDING PIXEL VALUE ADJUSTMENT FOR IMAGES PRODUCED WITH VARYING FOCAL LENGTH LENSES, filed May 11, 2007 (the '281 application) the entirety of which is incorporated herein by reference, is to store a fixed number of adjustment surfaces corresponding to specific focal lengths of a zoom lens and then interpolate or extrapolate an adjustment surface for each color channel from stored surfaces for a focal length which does not have a corresponding stored surface. However, even though the number of stored surfaces is less than the number of possible focal lengths, a relatively large memory storage may be required which may be a problem in some designs, in order to generate surfaces which sufficiently approximate the ideal, desired correction surfaces with sufficient accuracy.

Accordingly, improved methods, apparatuses and systems providing better-fitting adjustment surfaces given a certain amount of available storage capacity are desired. Variations in the required adjustments caused by, e.g., changes in focal length, iris opening and focus position can be corrected using disclosed embodiments.

DETAILED DESCRIPTION OF THE INVENTION

Figure 1:
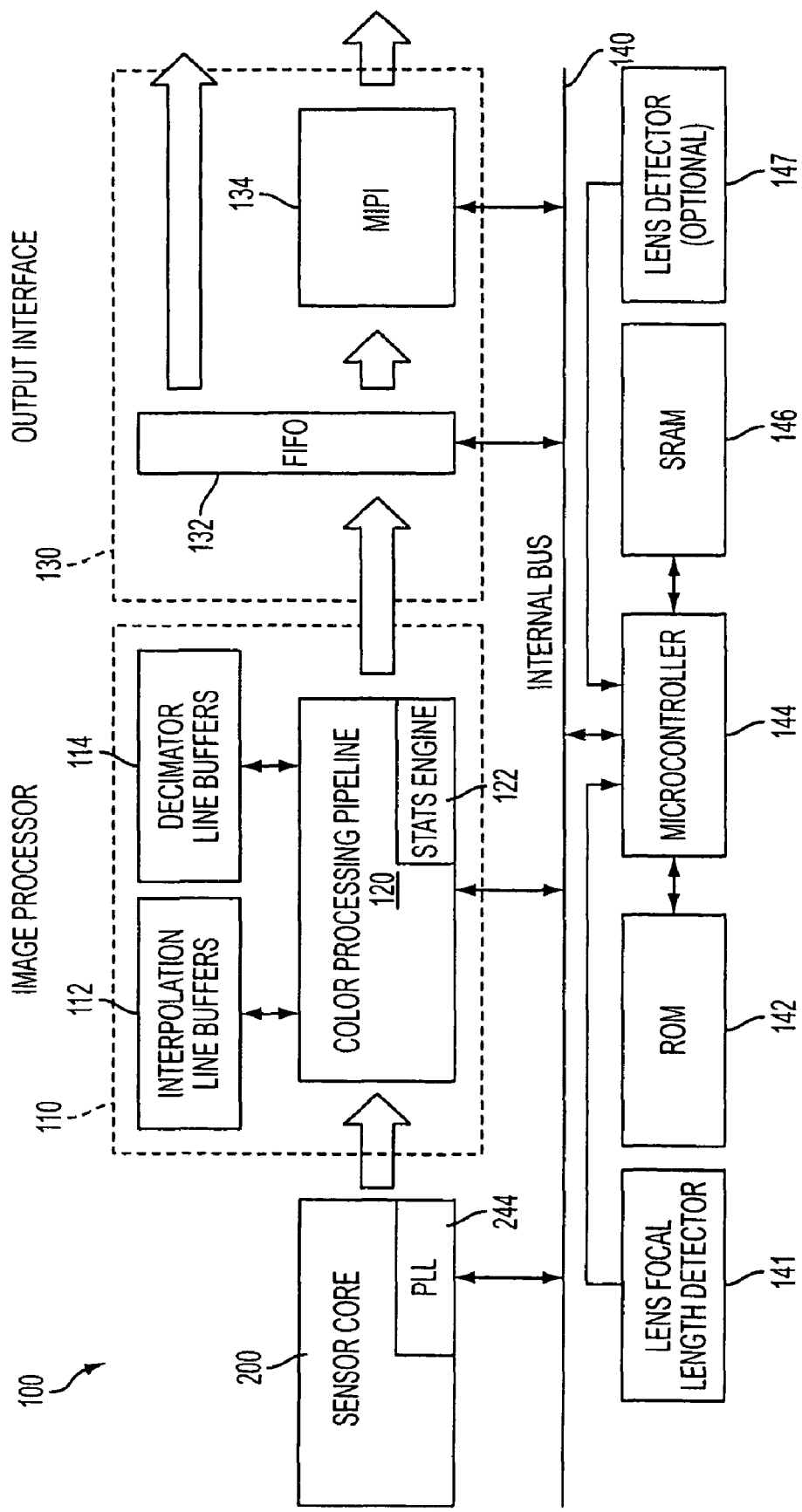
FIG. 1 illustrates a block diagram of a system-on-a-chip imager implementing disclosed embodiments.

In the following detailed description, reference is made to the accompanying drawings which form a part hereof, and in which are shown by way of illustration specific disclosed embodiments. These disclosed embodiments are described in sufficient detail to enable those skilled in the art to make and use them, and it is to be understood that structural, logical or procedural changes may be made. Particularly, in the description below, processes are described by way of flowchart. In some instances, steps which follow other steps may be in reverse or in a different sequence, or simultaneously, except where a following procedural step requires the presence of a prior procedural step. The processes described herein may be implemented in a pixel processing pipeline which in turn can be implemented using discrete hardware circuits, e.g. an ASIC, a programmed processor, or a combination of the two, but are not limited to such an implementation.

As noted, one method of making spatial pixel value adjustments for a variable focal length lens (or other optical states) is disclosed in the '281 application. This method stores a plurality of adjustment surfaces and, for focal lengths (or other optical states) for which an adjustment surface is not stored, determines an adjustment surface by interpolation or extrapolation. The '281 application also discloses storing the plurality of adjustment surfaces as a plurality of sets of coefficients, each set of coefficients corresponding to one of the plurality of stored adjustment surfaces. The coefficients are in turn used to produce the adjustment surfaces during pixel value processing. However, providing adjustment surfaces, or coefficients representing the same, for the number of focal lengths or other optical states required to achieve a desired quality level of correction may require a large quantity of storage.

Disclosed embodiments therefore, instead store a set of coefficients which can be used to generate a plurality of sets of surface coefficients which in turn can be used to generate a plurality of positional gain adjustment surfaces corresponding to multiple optical states, for example, of a lens, iris diaphragm, etc. "Surface coefficients" refer to the set of coefficients which represent the positional gain adjustment surfaces. Thus, a smaller set of coefficients may be stored to represent a plurality of adjustment surfaces to a high accuracy. The amount of memory storage required is dramatically reduced when a set of parameters or coefficients is stored to represent the plurality of sets of coefficients representing a plurality of adjustment surfaces as opposed to requiring a set of coefficients be stored for each of the plurality of adjustment surfaces.

As described in greater detail below, the disclosed embodiments described herein may be implemented in an image processor that uses any known pixel array adjustment technique employing a plurality of adjustment surfaces. The disclosed embodiments do not store the actual pixel correction values that make up the plurality of adjustment surfaces corresponding to each respective focal length (or other optical state) of the lens. The disclosed embodiments also do not store information about each of the plurality of adjustment surfaces individually, as in the '281 application where a lesser plurality are stored from which the full plurality may be interpolated. Instead, a mathematical representation of the total plurality of adjustment surfaces is stored. For example, coefficients may be stored from which additional coefficients are generated and further from which a correction function can be generated and used to produce the pixel correction values that make up any of the desired plurality of adjustment surfaces, one for each color channel.

For purposes of simplifying the following description, the disclosed embodiments are described below in connection with performing positional gain adjustment of the pixel values of a captured image captured using a zoom lens. However, the disclosed embodiments may be used for other pixel value corrections. Also, the disclosed embodiments are discussed with reference to color sensors, but may be used for correction of monochrome sensors as well. Additionally, disclosed embodiments may be used for storing a set of coefficients representing a plurality of sets of coefficients representing a plurality of adjustment surfaces for different optical states, such as, singly or in combination, focus position, diaphragm position, and/or focal length.

During operation of the disclosed embodiments, the focal length set for the zoom lens, for example, used during image capture is acquired. This may be done by automatic detection or by manual entry or electronic calculation of an estimate based on pulses sent to the lens position actuator, etc. Positional gain adjustment values for each pixel value are determined from a set of stored coefficients representing a plurality of sets of surface coefficients which are in turn used to generate an adjustment surface for each color channel corresponding to, for example, a focal length of the lens. Each adjustment surface is used to adjust pixel values for a captured image in a given color channel.

Turning to FIG. 1, an embodiment is now described in greater detail. FIG. 1 illustrates a block diagram of a system-on-a-chip (SOC) imager 100 which may use any type of image sensing technology, e.g., CCD, CMOS, etc.

The imager 100 comprises a sensor core 200 that communicates with an image processor circuit 110 that is connected to an output interface 130. A phase-locked loop (PLL) 244 is used as a clock for the sensor core 200. The image processor circuit 110, which is responsible for image and color processing, includes interpolation line buffers 112, decimator line buffers 114, and a color processing pipeline 120. The color processing pipeline 120 includes, among other things, a statistics engine 122. One of the functions of the color processing pipeline 120 is the performance of positional gain adjustments in accordance with the disclosed embodiments, as discussed below. Image processor circuit 110 may also be implemented as a digital hardware circuit, e.g., an ASIC, a digital signal processor (DSP), or may even be implemented on a stand-alone host computer.

The output interface 130 includes an output first-in-first-out (FIFO) parallel buffer 132 and a serial Mobile Industry Processing Interface (MIPI) output 134, particularly where the imager 100 is used in a camera in a mobile telephone environment. The user can select either a serial output or a parallel output by setting registers in a configuration register within the imager 100 chip. An internal bus 140 connects read only memory (ROM) 142, a microcontroller 144, and a static random access memory (SRAM) 146 to the sensor core 200, image processor circuit 110, and output interface 130. The read only memory (ROM) 142 may serve as a storage location for one or more sets of stored parameters representing pixel value adjustment surfaces. Optional lens focal length detector 141 and lens detector 147 may detect the focal length and the lens used, respectively.

Figure 2:
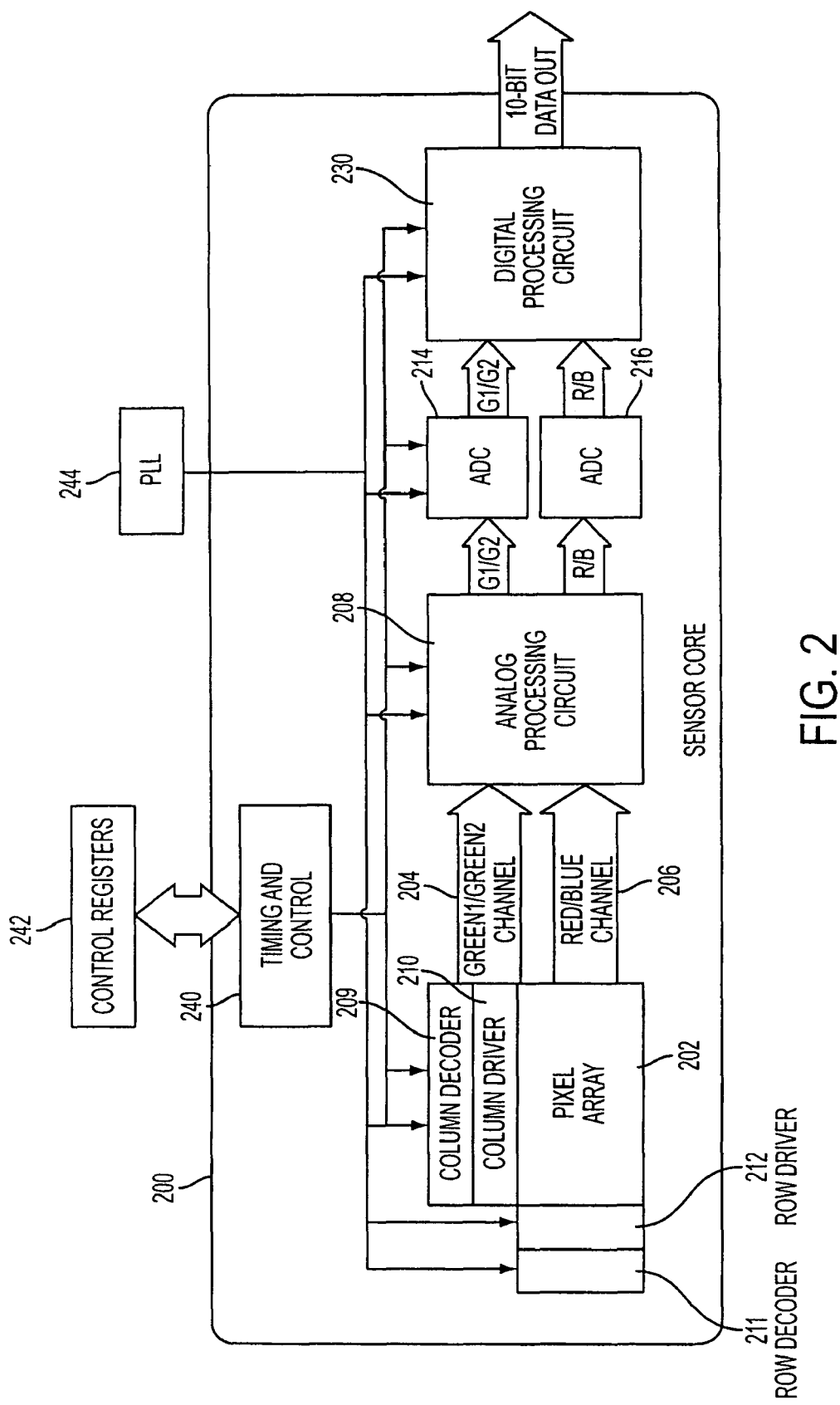
FIG. 2 illustrates an example of a sensor core used in the FIG. 1 imager.

FIG. 2 illustrates a sensor core 200 that may be used in the imager 100 (FIG. 1). The sensor core 200 includes, in one embodiment, a pixel array 202. Pixel array 202 is connected to analog processing circuit 208 by a green1/green2 channel 204, which outputs pixel values corresponding to the two green channels of the pixel array 202, and through a red/blue channel 206, which contains pixel values corresponding to the red and blue channels of the pixel array 202.

Although only two channels 204, 206 are illustrated, there are effectively two green channels and/or more than the three standard RGB channels. The green1 (i.e., Gr) and green2 (i.e., Gb) signals are read out at different times (using channel 204) and the red and blue signals are read out at different times (using channel 206). The analog processing circuit 208 outputs processed green1/green2 signals G1/G2 to a first analog-to-digital converter (ADC) 214 and processed red/blue signals R/B to a second analog-to-digital converter 216. The outputs of the two analog-to-digital converters 214, 216 are sent to a digital processing circuit 230. It should be noted that the sensor core 200 represents an architecture of a CMOS sensor core; however, disclosed embodiments can be used with any type of solid-states sensor core, including CCD and others.

Connected to, or as part of, the pixel array 202 are row and column decoders 211, 209 and row and column driver circuitry 212, 210 that are controlled by a timing and control circuit 240 to capture images using the pixel array 202. The timing and control circuit 240 uses control registers 242 to determine how the pixel array 202 and other components are controlled. As set forth above, the PLL 244 serves as a clock for the components in the sensor core 200.

The pixel array 202 comprises a plurality of pixels arranged in a predetermined number of columns and rows. For a CMOS imager, the pixels of each row in the pixel array 202 are all turned on at the same time by a row select line and the pixels of each column within the row are selectively output onto column output lines by a column select line. A plurality of row and column lines are provided for the entire pixel array 202. The row lines are selectively activated by row driver circuitry 212 in response to row decoder 211 and column select lines are selectively activated by a column driver 210 in response to column decoder 209. Thus, a row and column address is provided for each pixel. The timing and control circuit 240 controls the row and column decoders 211, 209 for selecting the appropriate row and column lines for pixel readout, and the row and column driver circuitry 212, 210, which apply driving voltage to the drive transistors of the selected row and column lines.

Each column contains sampling capacitors and switches in the analog processing circuit 208 that read a pixel reset signal Vrst and a pixel image signal Vsig for selected pixels. Because the sensor core 200 uses a green1/green2 channel 204 and a separate red/blue channel 206, analog processing circuit 208 will have the capacity to store Vrst and Vsig signals for green1/green2 and red/blue pixel values. A differential signal (Vrst−Vsig) is produced by differential amplifiers contained in the analog processing circuit 208. This differential signal (Vrst−Vsig) is produced for each pixel value. Thus, the signals G1/G2 and R/B are differential signals representing respective pixel values that are digitized by a respective analog-to-digital converter 214, 216. The analog-to-digital converters 214, 216 supply the digitized G1/G2 and R/B pixel values to the digital processing circuit 230 which forms the digital image output (for example, a 10 bit digital output). The output is sent to the image processor circuit 110 (FIG. 1) for further processing. The image processor circuit 110 will, among other things, perform a positional gain adjustment on the digital pixel values of the captured image. Although a CMOS sensor core has been described for providing pixels output signals of a captured image, other solid state imager sensor core architectures and readout devices, such as CCD and others, may also be used. Further, disclosed embodiments could be implemented on pixel values of an image not associated with a pixel array.

The color processing pipeline 120 of the image processor circuit 110 performs a number of operations on the pixel values received thereat, one of which is positional gain adjustment. In accordance with disclosed embodiments, the positional gain adjustment is performed using a set of stored coefficients representing coefficients for generating a plurality of positional gain adjustment surfaces available in, for example, ROM 142 or other forms of storage (e.g., SRAM and/or registers). For each color channel, the plurality of positional gain adjustment surfaces correspond with a plurality of optical states of a lens, such as to a set of pre-selected focal lengths of a variable focal length lens e.g., a zoom lens.

Figure 3:
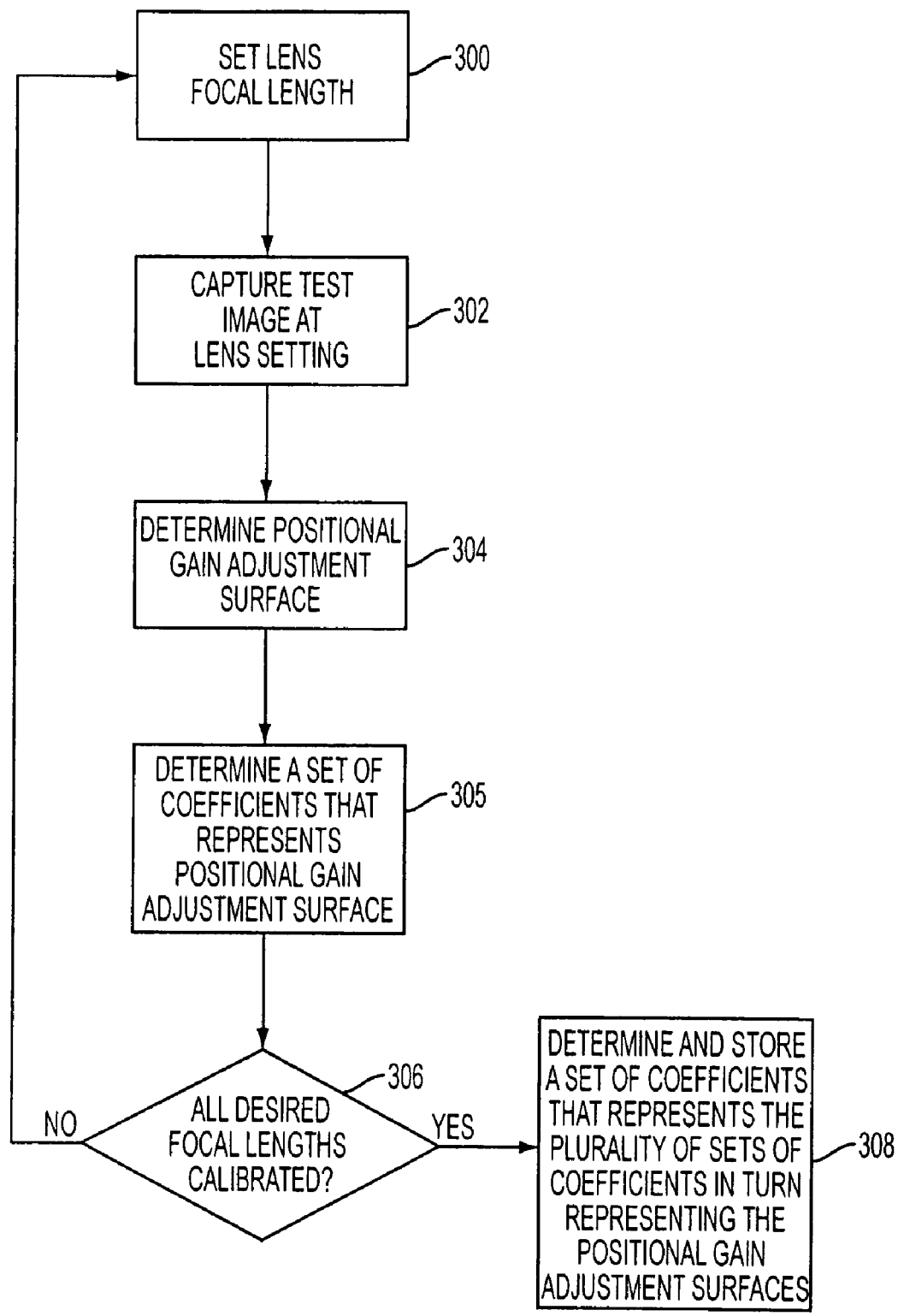
FIG. 3 illustrates an imager calibration process in accordance with disclosed embodiments.

Before a plurality of positional gain adjustment surfaces may be stored in accordance with disclosed embodiments, the plurality of positional gain adjustment surfaces must be determined. This is done during an imager calibration process. FIG. 3 illustrates in flowchart form how positional gain adjustment surfaces are captured and stored during such an imager calibration process, for example for a multiple focal length lens. All focal lengths of an example zoom lens must be corrected to a sufficient level of accuracy, in each color channel, by a corresponding one of the plurality of positional gain adjustment surfaces to be represented in memory by a set of coefficients that can then be used to generate the plurality of positional gain adjustment surfaces. The plurality of positional gain adjustment surfaces may include one for each focal length and for each color channel at which the images are able to be collected.

Referring to FIG. 3, during a calibration process for imager 100, a variable focal length lens is mounted on a camera containing imager 100. At step 300 of the calibration process, the variable focal length lens is set at one starting focal position. For the first of a plurality of focal length positions of the lens, a test scene or a target having uniform scene brightness, e.g., a grey card, is imaged by the imager 100 at step 302. At step 304, the variations in pixel responsiveness within each color channel across the pixel array 202 are determined. The inverse of a color channel's response is the positional gain adjustment surface for that color channel of the pixel array 202 at the set focal length. In step 305, a set of coefficients representing the positional gain adjustment surface for each color channel is determined. One example of a method, apparatus and system for determining this set of coefficients representing one of the plurality of positional gain adjustment surfaces is described in co-pending application Ser. No. 11/512,303, entitled METHOD, APPARATUS, AND SYSTEM PROVIDING POLYNOMIAL BASED CORRECTION OF PIXEL ARRAY OUTPUT, filed Aug. 30, 2006 ("the '303 application"), which is incorporated herein by reference in its entirety. A positional gain adjustment surface represents a pixel correction value for each pixel in one color channel of the pixel array 202 which, when multiplied by the associated pixel value, for example, will cause the pixels in the color channel to have substantially the same value.

In step 306, a determination is made as to whether all desired focal length positions of the lens have been calibrated. If test images have not been acquired for each of the desired focal length positions, the process returns to step 300 where the next focal length position is set. The process repeats steps 300, 302, 304, 305 and 306 until each of the focal length positions has a corresponding set of coefficients representing the positional gain adjustment surface for the pixel array 202. At step 308, a new set of coefficients representing the sets of coefficients that represent each of the plurality of positional gain adjustment surfaces is determined and stored in memory in accordance with disclosed embodiments and as described in more detail below with reference to FIG. 4.

There may be several focal lengths, for example 1000, associated with an exemplary zoom lens. Each of a plurality of positional gain adjustment surfaces is associated with a specific one of the 1000 focal lengths and a specific color channel. One or more test images would be taken (step 302) and a positional gain adjustment surface determined (step 304) and represented by coefficients (step 305) for each color channel for each of the 1000 focal length positions. These positional gain adjustment surfaces are represented in memory (step 308) as a set of coefficients that may be used to generate the sets of coefficients representing each of the plurality of positional gain adjustment surfaces, for each color channel, which in turn may be used to generate the positional gain adjustment surfaces associated with the 1000 focal lengths of the lens.

Although the example describes positional gain adjustment surfaces corresponding to the 1000 focal length positions of an example zoom lens used in the calibration procedure, a greater or fewer number of focal length positions may be calibrated in the disclosed embodiments. A sufficient number of focal lengths should be used in the calibration process, such that a positional gain adjustment surface for any intermediate focal length may be determined to a sufficient level of accuracy using the disclosed embodiments. Further, the focal lengths with associated positional gain adjustment surfaces may or may not be equally spaced in order to reduce the number required to achieve a desired degree of approximation to the ideal correction surfaces. Trial and error may be required to determine the optimal number and spacing of focal lengths to be used during calibration. The available focal lengths for a given lens may vary. For example, a focal length range of roughly 5-10 mm may be utilized in a mobile phone application. Additionally, it should be appreciated that the calibration process described above may or may not need to be performed for each individual imager but, if manufacturing tolerances permit, can be performed once for a group of imagers having similar pixel value response characteristics and the set of coefficients representing the plurality of sets of coefficients each one of which represents one of the plurality of positional gain adjustment surfaces may be stored for each imager of the group. If this is the case, then these coefficients may be stored in ROM 142, because ROM are manufactured in a large group, all with the same stored information.

At step 304 of the calibration process, pixel correction values for the pixel values are calculated for each pixel in the pixel array 202. This set of pixel correction values makes up the desired positional gain adjustment surface. A separate positional gain adjustment surface is determined for each color channel. The positional gain adjustment surface for each color channel may be approximated by a correction function, $F(x, y)$. A corrected pixel value $P(x, y)$, where $(x, y)$ represents the pixel location in a pixel array 202, is the captured image pixel value $P_{IN}(x, y)$ multiplied by a correction function, $F(x, y)$, to produce a pixel value as shown in Equation (1):

$$P(x, y) = P_{IN}(x, y) * F(x, y). \quad (1)$$

One example of a suitable correction function $F(x, y)$ is described in the '303 application, in which the correction function $F(x, y)$ may be represented by a polynomial, such as that of Equation (2):

$$F(x, y) = Q_n x^n + Q_{n-1} x^{n-1} + \ldots + Q_1 x^1 + Q_0, \quad (2)$$

where $Q_n$ through $Q_0$ are the coefficients of the correction function whose determination is described below. A different set of Q coefficients is determined for each row of the pixel array 202 by fitting a polynomial to the desired correction values. The letter "x" refers to a variable which is the value of the column location of the pixel. The letter "n" represents the order of the polynomial. The following polynomials are used to approximate coefficients $Q_n$ through $Q_0$:

$$Q_n = P_{(n,m)} y^m + P_{(n, m-1)} y^{m-1} + \ldots + P_{(n, 1)} y^1 + P_{(n, 0)} \quad (3)$$

$$Q_{n-1} = P_{(n-1, m)} y^m + P_{(n-1, m-1)} y^{m-1} + \ldots + P_{(n-1, 1)} y^1 + P_{(n-1, 0)} \quad (4)$$

$$Q_1 = P_{(1, m)} y^m + P_{(1, m-1)} y^{m-1} + \ldots + P_{(1, 1)} y^1 + P_{(1, 0)} \quad (5)$$

$$Q_0 = P_{(0, m)} y^m + P_{(0, m-1)} y^{m-1} + \ldots + P_{(0, 1)} y^1 + P_{(0, 0)} \quad (6)$$

where $P_{(n,m)}$ through $P_{(0,0)}$ are coefficients determined during the calibration process. The letter "y" refers to a variable which is the value of the row location of the pixel. The letter "m" represents the order of the polynomial.

The Q coefficients (i.e., "final coefficients") represent the coefficients of a polynomial function approximating correction factors for a row of the pixel array 202. The P coefficients represent a polynomial function approximating the Q coefficients. The function values $F(x, y)$ for each pixel make up a positional gain adjustment surface. A set of P coefficients (i.e., "surface coefficients") represents a single positional gain adjustment surface.

In the '303 application, the P coefficients are stored in memory and each set represents a single adjustment surface. The image processor circuit 110 uses the P coefficients to determine each Q coefficient for the correction function. The Q coefficients can then be used to generate a row's correction function during image processing and accordingly generate the pixel correction values, as discussed in the '303 application.

The process of the '303 application reduces the amount of memory required for storing a representation of an adjustment surface as compared to the amount of memory required to store all the pixel correction values making up the positional gain adjustment surface. For an example 1024×1024 pixel array 202, and assuming order three polynomials, the number of stored values is reduced from 1,048,576 (if each individual pixel correction value is stored) to 16 (the number of P coefficients required to represent the positional gain adjustment surface). However, this set of P coefficients represent only a single adjustment surface for a single focal position of the lens. In order to store several adjustment surfaces, the number of P coefficients would increase based on the number of representations of adjustment surfaces to be stored. Continuing the same example, 16 coefficients are needed to represent one adjustment surface. If, for example, 1000 positional gain adjustment surfaces are required, then 16×1000 (16,000) coefficients must be stored in order to store the plurality of positional gain adjustment surfaces.

Various methods of determining a set of coefficients representing a single positional gain adjustment surface (other than that disclosed in the '303 application) may be used with the disclosed embodiments. Disclosed embodiments provide a method, system and apparatus to provide a representation of a greater number of adjustment surfaces (or in other words, a plurality of sets of coefficients, each representing a single adjustment surface) using a smaller number of coefficients.

Disclosed embodiments provide a system, method and apparatus by which a plurality of positional gain adjustment surfaces may be stored in less memory, such as by further representing the P coefficients of the '303 application, for each color channel, as at least a smaller, additional set of coefficients. By way of illustration, disclosed embodiments represent a plurality of adjustment surfaces as a three-dimensional solid. The solid may either represent a continuous succession of adjustment surfaces or a stack of a finite number of adjustment surfaces. Each positional gain adjustment surface corresponds to a focal position of the lens and is represented by a "slice" from the three-dimensional solid. For example, each positional gain adjustment surface could be analogized as a sheet of paper with a two-dimensional array of pixel correction values written on the surface of the paper. The three-dimensional solid results when a stack of paper is created, each sheet of paper representing a different positional gain adjustment surface. Each color channel is represented by a separate three-dimensional solid. The '303 application discloses a method to represent the pixel correction values listed on a single sheet of paper as a set of coefficients which saves memory over storing each of the individual pixel correction values individually.

Disclosed embodiments save space in memory and/or allow a greater number of adjustment surfaces to be utilized by further representing the sets of coefficients for each surface by a set of coefficients representing a plurality of adjustment surfaces. In other words, one set of coefficients represents a plurality of adjustment surfaces rather than a single adjustment surface. Each P coefficient, as a function of focal length, is approximated by a polynomial, which is represented by a set of coefficients. Thus, all the sets of P coefficients (each set of which represents a single adjustment surface) could be further approximated by an additional set of polynomials, represented by a new set of coefficients. The calibration process generates a set of polynomials to approximate the respective P coefficients (step 308) for a plurality of adjustment surfaces in a third dimension, e.g., focal length. The coefficients of these polynomials would thus represent a plurality of adjustment surfaces. The present description uses the letter R to represent the coefficients of these polynomials which are used to generate the P coefficients which are, in turn, used to generate adjustment surfaces each corresponding to a different set of adjustment values. The following polynomials are used to approximate coefficients $P_{(n, m)}$ through $P_{(0, 0)}$ in Equations (3)-(6) above. Thus, for Equations (3)-(6) above, the P coefficients can be represented as shown in Equation (7):

$$P_{(i,j)} = R_{(i,j,b)}z^b + R_{(i,j,b-1)}z^{b-1} + \ldots + R_{(i,j,1)}z^1 + R_{(i,j,0)}, \quad (7)$$

where i varies from 0 to n and j varies from 0 to m ("n" and "m" are the same as in Equations (1)-(6)), $R_{(i, j, b)}$ through $R_{(i, j, 0)}$ are coefficients determined during the calibration process, the letter "z" refers to a variable, for example the focal length, which corresponds to the specific positional gain adjustment surface to which the pixel correction values belong (e.g., the specific sheet of paper) and the letter "b" represents the order of the polynomial. Note that to represent/approximate a given $P_{(i, j)}$, the number of R coefficients needed is equal to "b+1."

Figure 4:
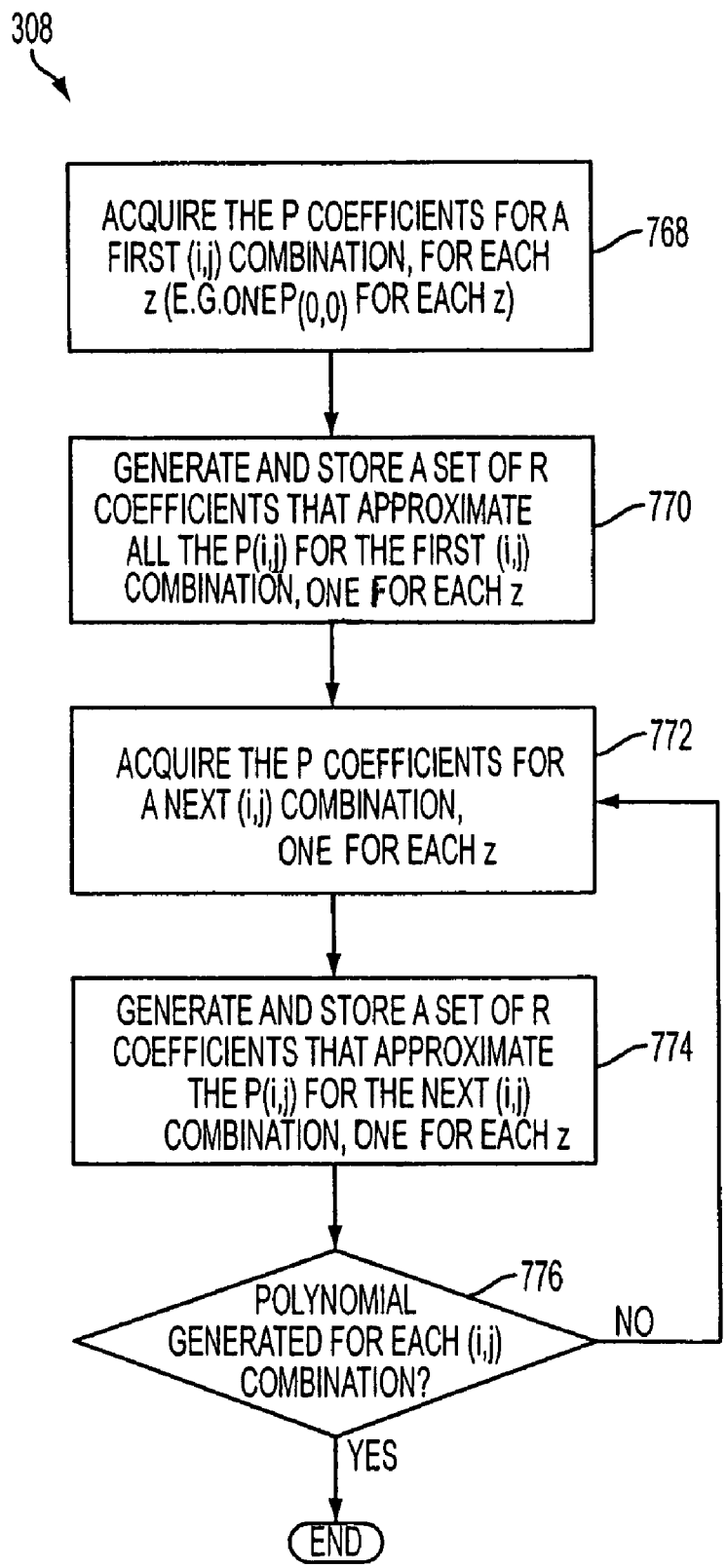
FIG. 4 illustrates a process for approximating and storing a plurality of adjustment surfaces in accordance with disclosed embodiments.

FIG. 4 illustrates step 308 of FIG. 3 in more detail. Step 308 is a process of calculating coefficients to represent a plurality of adjustment surfaces for pixels in a pixel array 202. At steps 768 and 770, the calibration process acquires all the $P_{(i,j)}$ for a first combination of "i" and "j", for all "z"s, fits a polynomial (in z) to all of the desired $P_{(i, j)}$ and stores the R coefficients. The polynomial may be fit using any procedure for finding the best-fitting polynomial to a given set of points, such as, for example, least squares fitting. Now, given a desired z, the approximate $P_{(i, j)}$ can be generated at z. This process is repeated at steps 772-776 to generate and store coefficients ($R_{i,j,b}$) for polynomials approximating the other of the $P_{(i, j)}$, for any desired z. Once $R_{(i,j,b)}$ are generated and stored for each (i,j) combination, the calibration process ends. From these R coefficients, for any given value of "z" (e.g., focal length position), an approximation for all the $P_{(i, j)}$ needed to generate a correction surface for the desired value of "z" may be generated.

If order three polynomials are used to approximate the P coefficients, then there would be four R coefficients required to represent each of the (m+1)(n+1) P coefficients, for each color channel. In the above example, which requires 16,000 coefficients to represent the 1000 positional gain adjustment surfaces, the number of necessary stored coefficients is reduced to only 64, for each color channel. The R coefficients are stored in memory for use in generating the P coefficients which in turn generate the positional gain adjustment surfaces in subsequent pixel correction procedures.

The disclosed embodiments allow more accurate adjustment surfaces to be represented in the same amount of memory and/or reduce the amount of memory required for a given degree of accuracy of approximation or quality of fit.

It should be noted that F(x, y) in Equation (2) above is only one example of how to provide positional gain adjustment coefficients or parameters to be used to generate positional gain adjustment surfaces; other types of functions, such as piecewise-quadratic, for example, may be used. It should also be noted that the F(x, y) values may be provided for a different positional gain adjustment surface corresponding to each color channel. Accordingly, if four color channels are used (green1, green2, blue, red), there are four values of F(x, y), respectively, with each color channel being represented by a separate positional gain adjustment surface. It should also be noted that, rather than the polynomial approximation shown in Equation (7), the "R" coefficients representing a plurality of complete adjustment surfaces, may be the coefficients of other types of non-polynomial functions, such as, for example, piecewise-quadratic.

The set of coefficients representing the plurality of adjustment surfaces (R coefficients) is then stored in memory at step 778. Thus, referring to the example zoom lens discussed above, 1000 positional gain adjustment surfaces corresponding to 1000 lens focal positions are determined in the calibration procedure illustrated in FIG. 3. A representation of the P coefficients representing these 1000 positional gain adjustment surfaces is then ultimately stored in ROM 142 or other storage medium as R coefficients which are used during image adjustment to generate the P coefficients which are in turn used to generate pixel correction values to adjust the pixel values.

The positional gain adjustment process can be performed by image processor circuit 110 of FIG. 1, using the pre-stored R coefficients to determine the P coefficients and the associated adjustment surfaces for each color channel. The image processor circuit 110 has access to this relatively small number of stored R coefficients. The image processor circuit 110 receives a signal from focal length detector 141 (or from a manual input), representing the set focal length of the variable focal length lens used during image capture. Once the pixel array 202 pixel values for the captured image are output by the sensor core 200, the image processor circuit 110, among other captured image pixel processing functions, performs positional gain adjustment by adjusting the pixel values using a set of corresponding pixel correction values from a generated adjustment surface corresponding to the detected focal length of the lens which is determined from the stored R coefficients. The set focal length of the lens used to capture the image is acquired by automatic acquisition detecting the lens focal length using a focal length detector as shown in FIG. 1, by manually inputting a value, or by an electronically estimated calculation based on pulses sent to the lens position actuator, etc. Then, an image may be captured and the captured focal length can be stored for use in generating an adjustment surface used in pixel value adjustment.

Figure 5:
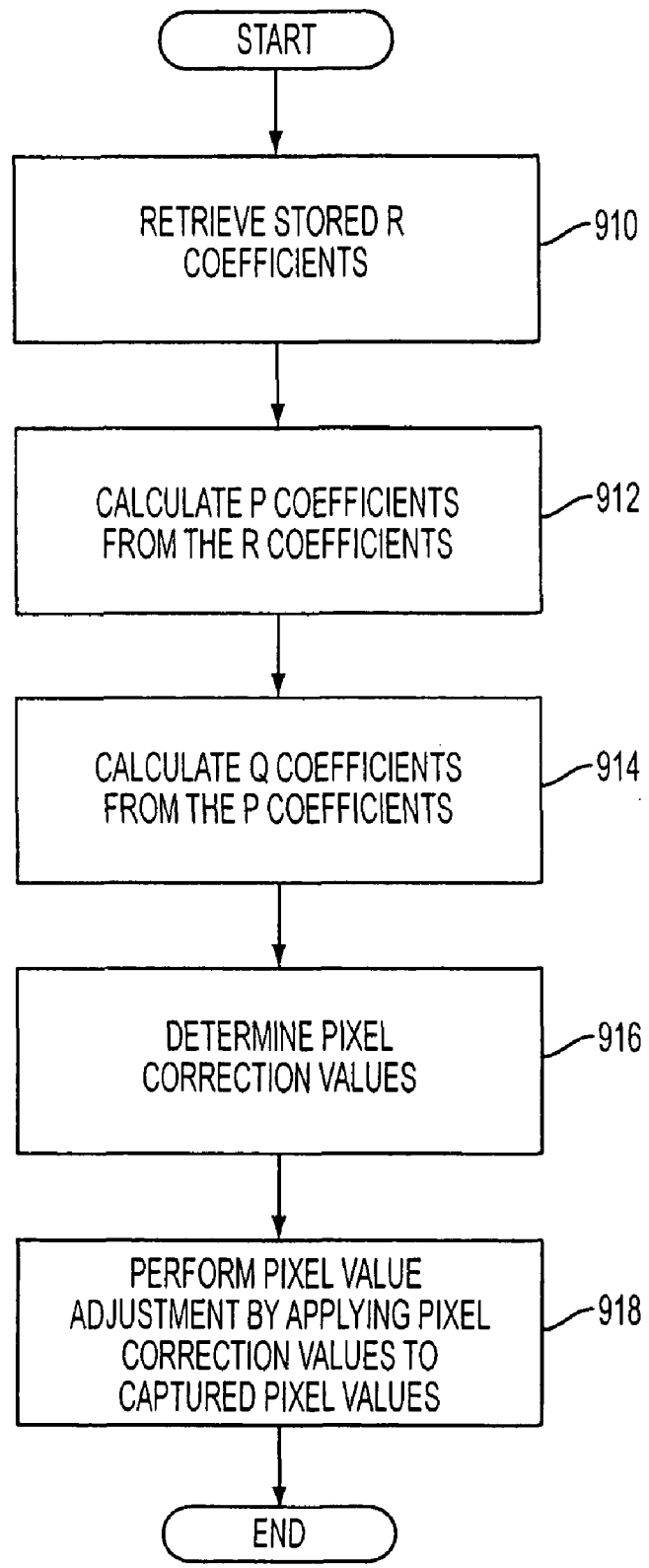
FIG. 5 illustrates a process for performing positional gain adjustment in accordance with disclosed embodiments.

The image processor circuit 110 generates the positional gain adjustment surface from the stored R coefficients. The values of the R coefficients can be used to determine and scan out the pixel correction values of the adjustment surface corresponding to a particular focal lens position. This process is illustrated in FIG. 5. The image processor circuit 110 retrieves the R coefficients from a storage location, at step 910. At step 912, the image processor circuit 110 determines, from the R coefficients, the P coefficients which represent the adjustment surface at that particular focal lens position, by evaluating the P-coefficient equation (e.g., Equation (7)) for the "z" value which corresponds to the particular focal lens position. At step 914, the P coefficients are then used to determine the Q coefficients by evaluating the Q-coefficient equations (e.g., Equations (3) through (6)) for each row of the pixel array 202. The Q coefficients represent the correction functions for each row of the adjustment surface. Pixel correction values for each pixel in the pixel array 202 are determined at step 916 by evaluating the correction functions at each column value of the pixel array 202. Then, at step 918, positional gain adjustment is performed by applying the pixel correction values to the pixel values of the captured image.

Further, disclosed embodiments may employ more than the three dimensions just described and may store coefficients of any multi-dimensional array. For example, a four-dimensional solid may approximate positional gain adjustment correction dependent not only on focal length, but also on iris opening. The stored coefficients are used to determine indirectly the surface coefficients. One or more intermediate sets of coefficients are determined in succession, one from the other, beginning with the set of stored coefficients and ending with one or more sets of surface coefficients.

While disclosed embodiments have been described for use in correcting positional gains for an acquired image, the methods of surface generation and representation may also be used to represent and to generate the data needed for other pixel corrections needed when pixel values of the pixel array 202 are affected by variations in optical state, along one or more dimensions. For example, correction of crosstalk between and among pixels may vary with focal length, etc.

When employed in a video camera, pixel value corrections may be employed in real time for each captured frame of the video image.

Disclosed embodiments may be implemented as part of a pixel value processing pipeline 110 by a processor executing a program, by hardware circuits with processing pipeline 110, or by a combination of both.

Disclosed embodiments may be implemented as part of a camera such as e.g., a digital still or video camera, or other image acquisition system, and also may be implemented as a stand-alone or plug-in software component for use in image editing applications. In such applications, the process described above with reference to FIGS. 4 and 5 can be implemented as computer instruction code and stored R coefficients contained on a storage medium for use in a computer image processing system.

Disclosed embodiments may also be implemented for digital cameras having interchangeable variable focal length lenses. In such an implementation, positional gain adjustment surfaces are acquired (FIG. 3) and stored for a plurality of focal length positions for each of a plurality of variable focal length lenses. The camera will sense with lens detector 147 (FIG. 1), which interchangeable variable focal length lens is being used with the camera. Alternatively, this information may be manually entered. The camera then uses the lens detection and focal length detection information to generate an appropriate positional gain adjustment surface for use in processing the positional gain adjustment. A lens 835 allows an image of an object being viewed to pass to the imager 100 when a shutter release button 840 is depressed. The lens 835 may be a zoom lens.

Figure 6:
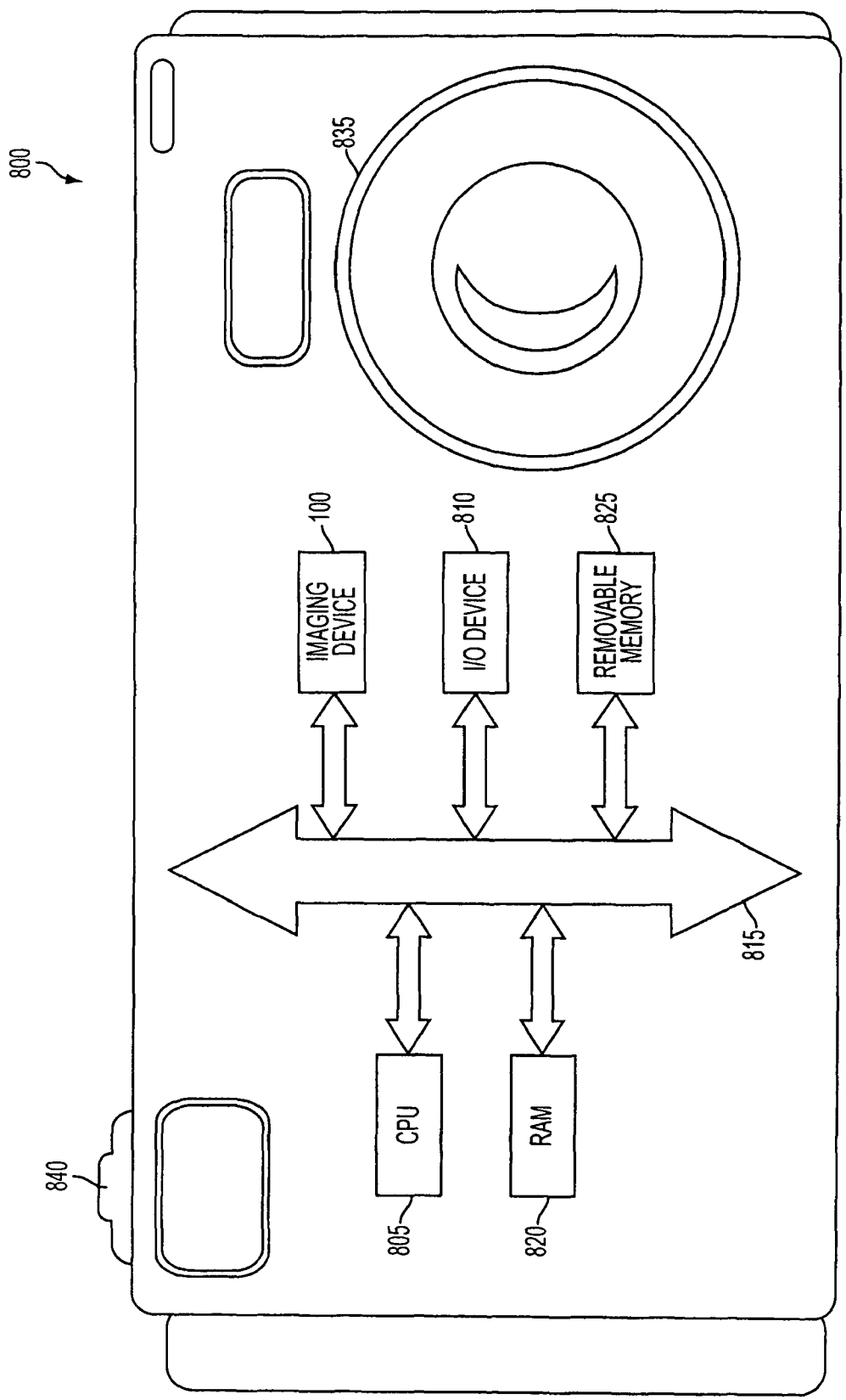
FIG. 6 illustrates a processing system, for example, a digital still or video camera system, constructed in accordance with disclosed embodiments.

FIG. 6 illustrates a processor system as part of, for example, or digital still or video camera system 800 employing a system-on-a-chip imager 100 as illustrated in FIG. 1, which imager 100 provides for positional gain adjustment and other pixel value corrections as described above. The processing system includes a processor 805 (shown as a CPU) which implements system, e.g. camera 800, functions and also controls image flow. The processor 805 is coupled with other elements of the system, including random access memory 820, removable memory 825 such as a flash or disc memory, one or more input/out devices 810 for entering data or displaying data and/or images and imager 100 through bus 815 which may be one or more busses or bridges linking the processor system components.

The camera system 800 is an example of a system having digital circuits that could include imagers. Without being limiting, such a system could include a computer system, camera system, scanner, machine vision, vehicle navigation, video phone, surveillance system, auto focus system, star tracker system, motion detection system, image stabilization system, and data compression system.

While disclosed embodiments have been described in detail, it should be readily understood that the invention is not limited to the disclosed embodiments. Rather the disclosed embodiments can be modified to incorporate any number of variations, alterations, substitutions or equivalent arrangements not heretofore described.

What is claimed as new and desired to be protected by Letters Patent of the United States is:

1. An imaging device comprising:
    an array of pixels for capturing an image and providing pixel values;
    a storage device for storing a set of stored coefficients which represent at least one set of surface coefficients; and
    a pixel processing circuit configured to:
        use the set of stored coefficients to generate the at least one set of surface coefficients, each set of the at least one set of surface coefficients representing a complete adjustment surface,
        produce a set of final coefficients, using the corresponding set of surface coefficients, the set of final coefficients representing a portion of the adjustment surface, and
        use the set of final coefficients to determine correction values of the adjustment surface and adjust the pixel values using the correction values represented by the adjustment surface.

2. The imaging device of claim 1, wherein each adjustment surface corresponds to a particular color channel of the array.

3. The imaging device of claim 1, wherein the set of stored coefficients is a polynomial representation of the at least one set of surface coefficients.

4. The imaging device of claim 1, wherein each of the at least one set of surface coefficients is a polynomial representation of the corresponding set of final coefficients.

5. The imaging device of claim 1, wherein the at least one set of surface coefficients are determined during a calibration process.

6. The imaging device of claim 5, wherein the set of stored coefficients is determined based on the at least one set of surface coefficients during the calibration process.

7. The imaging device of claim 1, wherein the set of stored coefficients is used to generate the at least one set of surface coefficients in accordance with:

$$P_{(i,j)} = R_{(i,j,b)} z^b + R_{(i,j,b-1)} z^{b-1} + \ldots + R_{(i,j,1)} z^1 + R_{(i,j,0)},$$

wherein $R_{(i,j,b)}$ through $R_{(i,j,0)}$ are at least some of the set of stored coefficients, $P_{(i,j)}$ is one of the surface coefficients, z corresponds to an optical state and b is the order of the polynomial, $P_{(i,j)}$.

8. A digital camera comprising:
a lens having a plurality of possible optical states;
a pixel array for capturing an image received through the lens;
a storage area for storing at least a set of stored coefficients representing a plurality of sets of surface coefficients which represent a set of final coefficients which represent a plurality of sets of pixel correction values for the pixels, each set of pixel correction values corresponding to a respective possible optical state of the lens, each set of surface coefficients representing a complete set of pixel correction values and each set of final coefficients representing a portion of the complete set of correction values; and
a pixel array processing circuit which, using a detected or estimated optical state and the at least a set of stored coefficients, is configured to determine a particular set of pixel correction values for correcting pixel values based on the detected optical state, and to correct the pixel values for a captured image using the determined set of pixel correction values, wherein the particular set of pixel correction values is determined from the sets of final coefficients which are determined from a corresponding one of the plurality of sets of surface coefficients, and wherein the corresponding one of the plurality of sets of surface coefficients is determined from the at least a set of stored coefficients.

9. The digital camera of claim 8, wherein a plurality of sets of pixel correction values are provided for a single optical state.

10. The digital camera of claim 8, wherein the plurality of possible optical states are zoom positions of the lens and the camera is configured with different interchangeable zoom lenses and wherein the plurality of sets of surface coefficients determined from the at least a set of stored coefficients determine a set of final coefficients which determine a plurality of pixel correction values in respective correspondence with a plurality of different possible focal lengths for each of the interchangeable zoom lenses.

11. The digital camera of claim 8, wherein the plurality of possible optical states are iris positions of the lens and wherein the plurality of sets of surface coefficients determined from the at least a set of stored coefficients determine a set of final coefficients which determine a plurality of pixel correction values in respective correspondence with a plurality of different possible iris positions of the lens.

12. The digital camera of claim 8, wherein the plurality of possible optical states are zoom positions of the lens and wherein the plurality of sets of surface coefficients determined from the at least a set of stored coefficients determine a set of final coefficients which determine a plurality of pixel correction values in respective correspondence with a plurality of different possible zoom positions of the lens.

13. A method of processing pixel values of an image comprising:
with an image processor, using a first set of stored coefficients to generate at least one set of surface coefficients, each set of the at least one set of surface coefficients representing a complete adjustment surface corresponding with an optical state used during image capture;
with the image processor, using one set of the generated sets of surface coefficients to further generate a plurality of final sets of coefficients, each set of final coefficients representing a portion of the adjustment surface; and
with the image processor, adjusting the pixel values of the image using correction values represented by the adjustment surface.

14. The method of claim 13, wherein the first set of stored coefficients is a polynomial representation of the at least one set of surface coefficients.

15. The method of claim 13, wherein each of the at least one set of surface coefficients is a polynomial representation of the final set of coefficients.

16. The method of claim 13, wherein the set of stored coefficients is used to generate the at least one set of surface coefficients in accordance with:

$$P_{(i,j)} = R_{(i,j,b)} z^b + R_{(i,j,b-1)} z^{b-1} + \ldots + R_{(i,j,1)} z^1 + R_{(i,j,0)},$$

wherein $R_{(i,j,b)}$ through $R_{(i,j,0)}$ are at least some of the set of stored coefficients, $P_{(i,j)}$ is one of the set of surface coefficients, z corresponds to the optical state used during image capture and b is the order of the polynomial.

17. A method of operating an imaging system, the method comprising:
acquiring a first test image using a first optical state of a lens;
acquiring a second test image using a second optical state of the lens;
determining a first respective set of pixel correction values for the first acquired test image;
determining a second respective set of pixel correction values for the second acquired test image;
determining a first set of coefficients to approximate each row of the first set of pixel correction values;
determining a second set of coefficients to approximate each row of the second set of pixel correction values;
determining a third set of coefficients to approximate the first set of coefficients, the third set of coefficients thereby representing a first adjustment surface containing the first set of pixel correction values;
determining a fourth set of coefficients to approximate the second set of coefficients, the fourth set of coefficients thereby representing a second adjustment surface containing the second set of pixel correction values;
determining a fifth set of coefficients to approximate at least the third and fourth sets of coefficients, the fifth set of coefficients thereby representing a plurality of adjustment surfaces; and
storing the fifth set of coefficients.

18. The method of claim 17, further comprising:
acquiring an image to be captured;
determining the optical state of the lens during acquisition of the image to be captured;
retrieving the fifth set of coefficients;
using the fifth set of coefficient to determine the one of the third and fourth sets of coefficients corresponding to the one of the first and second sets of coefficients which corresponds to the optical state of the lens during acquisition of the image to be captured;

using the one of the third and fourth sets of coefficients to determine the one of the first and second sets of coefficients;

determining the respective set of pixel correction values from the corresponding one of the first and second sets of coefficients; and applying the pixel correction values to the captured image.

19. The method of claim 17, wherein the first and second sets of coefficients represent one of a polynomial approximation and a piecewise quadratic approximation for each row of the first and second respective sets of pixel correction values.

20. The method of claim 17, wherein the third and fourth sets of coefficients represent one of a polynomial approximation and a piecewise quadratic approximation for each coefficient of the first and second respective sets of coefficients.

21. The method of claim 17, wherein the fifth set of coefficients represents one of a polynomial approximation and a piecewise quadratic approximation for each coefficient of at least the third and fourth sets of coefficients.

22. A three-dimensional adjustment model representing a plurality of adjustment surfaces, the adjustment model comprising:

a set of stored coefficients capable of generating the plurality of adjustment surfaces;

a plurality of sets of surface coefficients, the plurality of sets of surface coefficients being generated from the first set of coefficients, each set of the plurality of sets of surface coefficients representing a complete one of the plurality of adjustment surfaces; and a plurality of sets of final coefficients corresponding one set each to a respective portion of one of the plurality of adjustment surfaces, each set of the plurality of sets of final coefficients being generated from the corresponding one of the plurality of sets of surface coefficients, each of the plurality of sets of final coefficients representing pixel correction values for a portion of the corresponding adjustment surface.

23. The three-dimensional adjustment model of claim 22, wherein the pixel correction values generated from the corresponding set of final coefficients may be used to adjust the pixel values of a pixel array.

24. The three-dimensional adjustment model of claim 22, wherein each of the set of stored coefficients, the plurality of sets of surface coefficients and the plurality of sets of final coefficients are polynomial representations of the plurality of sets of surface coefficients, the corresponding plurality of sets of final coefficients and a set of pixel correction values, respectively.

25. The three-dimensional adjustment model of claim 22, wherein each of the plurality of adjustment surfaces comprises a set of pixel correction values.

* * * * *